(12) United States Patent
Pollini et al.

(10) Patent No.: US 10,774,465 B2
(45) Date of Patent: Sep. 15, 2020

(54) PROCESSES FOR DEPOSITION OF ELEMENTAL SILVER ONTO A SUBSTRATE

(71) Applicants: CARESILK SRLS, Lecce (IT); Alessandro Sannino, Lecce (IT)

(72) Inventors: Mauro Pollini, Merine (IT); Federica Paladini, Surbo (IT); Alessandro Sannino, Lecce (IT)

(73) Assignees: CARESILK SRLS, Lecce (IT); Alessandro Sannino, Lecce (IT)

( * ) Notice: Subject to any disclaimer, the term of this patent is extended or adjusted under 35 U.S.C. 154(b) by 0 days.

(21) Appl. No.: 16/131,186

(22) Filed: Sep. 14, 2018

(65) Prior Publication Data

US 2019/0218707 A1 Jul. 18, 2019

Related U.S. Application Data

(63) Continuation of application No. PCT/EP2017/055960, filed on Mar. 14, 2017.

(60) Provisional application No. 62/307,905, filed on Mar. 14, 2016.

(51) Int. Cl.
| | | |
|---|---|---|
| *D06M 10/00* | (2006.01) | |
| *D06M 10/06* | (2006.01) | |
| *A01N 25/34* | (2006.01) | |
| *A01N 59/16* | (2006.01) | |
| *D06M 11/83* | (2006.01) | |
| *D06M 16/00* | (2006.01) | |
| *C23C 18/14* | (2006.01) | |
| *D06M 10/02* | (2006.01) | |
| *D06M 101/06* | (2006.01) | |

(52) U.S. Cl.
CPC .............. *D06M 10/06* (2013.01); *A01N 25/34* (2013.01); *A01N 59/16* (2013.01); *C23C 18/14* (2013.01); *D06M 10/001* (2013.01); *D06M 10/025* (2013.01); *D06M 11/83* (2013.01); *D06M 16/00* (2013.01); *D06M 2101/06* (2013.01); *D06M 2200/00* (2013.01)

(58) Field of Classification Search
CPC ............... D06M 10/001; D06M 16/00; D06M 2400/01; D06M 23/00; D06M 10/06; A01N 2300/00; A01N 59/16
See application file for complete search history.

(56) References Cited

U.S. PATENT DOCUMENTS

| | | | | |
|---|---|---|---|---|
| 6,979,491 B2 * | 12/2005 | Yan | ........................ | D02G 3/449 |
| | | | | 106/1.13 |
| 2009/0130181 A1 * | 5/2009 | Pollini | ................... | A01N 59/16 |
| | | | | 424/443 |

OTHER PUBLICATIONS

Bardajee, G. R. et al., "Preparation and Investigation on Swelling and Drug Delivery Properties of a Novel Silver/Salep-g-Poly(Acrylic Acid) Nanocomposite Hydrogel", Bulletin of the Korean Chemical Society, vol. 33, No. 8, Aug. 20, 2012, 2635-2641.
Pollini, M. et al., "Antibacterial natural leather for application in the public transport system", Journal of Coatings Technology and Research, vol. 10, No. 2, Mar. 2013, 239-245.

(Continued)

*Primary Examiner* — Eisa B Elhilo
(74) *Attorney, Agent, or Firm* — Edgar W. Harlan; Carolyn S. Elmore; Elmore Patent Law Group, P.C.

(57) ABSTRACT

The invention relates to methods of depositing silver onto a substrate using a dilute silver salt solution.

18 Claims, 1 Drawing Sheet

(56) References Cited

OTHER PUBLICATIONS

Pollini, M. et al., "Development of hybrid cotton/hydrogel yarns with improved absorption properties for biomedical applications", Materials Science and Engineering C, Elsevier Sciences.A, CH, vol. 63, Mar. 11, 2016, 563-569.

Pollini, M. et al., "Silver-coated wool yarns with durable antibacterial properties", Journal of Applied Polymer Science, vol. 125, No. 3, Jan. 20, 2012, 2239-2244.

Sun, Z. et al., "Multistimuli-Responsive, Moldable Supramolecular Hydrogels Cross-Linked by Ultrafast Complexation of Metal Ions and Biopolymers", Angewandte Chemie International Edition, vol. 54, No. 27, Jun. 26, 2015, 7944-7948.

* cited by examiner

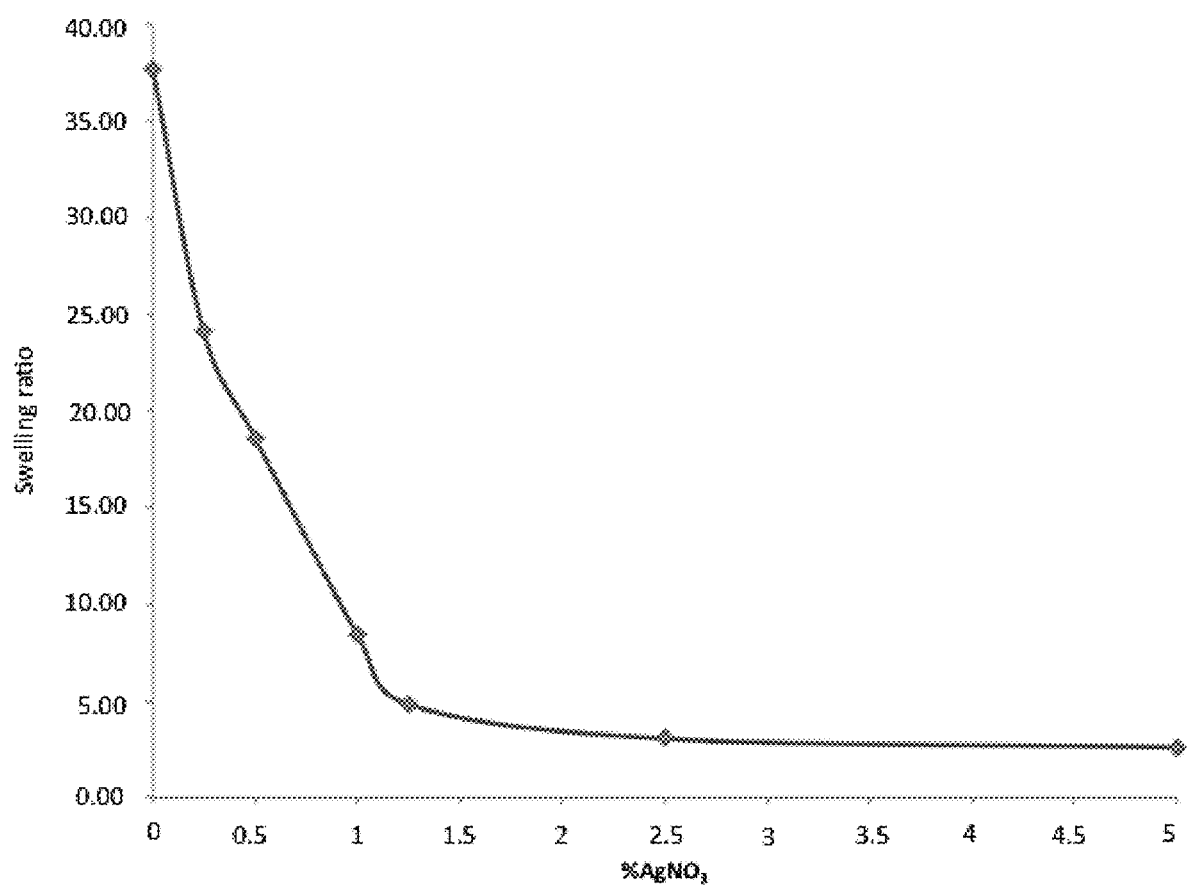

PROCESSES FOR DEPOSITION OF ELEMENTAL SILVER ONTO A SUBSTRATE

RELATED APPLICATIONS

This application is a continuation of International Application No. PCT/EP2017/055960, which designated the United States and was filed on Mar. 14, 2017, published in English, which claims the benefit of U.S. Provisional Application No. 62/307,905, filed on Mar. 14, 2016. The entire teachings of the above applications are incorporated herein by reference.

FIELD OF THE INVENTION

The present invention relates to a process for depositing elemental silver onto a substrate to obtain antibacterial substrates by silver deposition in the form of firmly bonded small particles and to the antibacterial substances obtained by aforementioned treatments.

BACKGROUND OF THE INVENTION

Silver has been known as a purifying agent since ancient Egypt when it was employed to purify water for lengthy storage. Modern medicine makes use of silver as an antibacterial agent in the treatment of burns and eye infections in new-born babies (M. Potenza, G. Levinsons, AIM Magazine 59:39 (2004)). Silver solutions have been used as antibacterial agents in the treatment of infected wounds, and silver is used in the purification of water on the NASA space shuttle. The anti-inflammatory properties of silver have been shown by a reduced reddening of infected wounds edges. Other heavy metals, such as zinc, lead, gold, nickel, cadmium, copper and mercury, are also known to have antibacterial properties, but some of them cannot be used because of their toxicity or high costs. Among heavy metals, only silver, zinc and copper can be used as antibacterial agents. Zinc is the least effective of these, while copper, though highly effective against some mildews, and has a synergistic effect when combined with silver, cannot be used in contact with food. Silver ion is the most effective ion with the lowest toxicity. On this subject, see: J. M. Schierholz, L. J. Lucas, A. Rump, G. Pulverer, *Journal of Hospital Infection* (1008) 40: 257-262; Gadd G M, Laurence O S, Briscoe P A, Trevors J T. *Silver accumulation in Pseudomonas stutzeri AG 259*. Bio Metals 1989; 2: 168-173; Wahlberg J E. *Percutaneous toxicity of metal compounds*. Arch Environ Health 1989; 11: 201-203; Williams R L, Williams D F. *Albumin adsorption on metal substrates*. Biomat 1988; 9: 206.

Materials coated with silver release silver ions that attach to bacterial cells, incapacitating them and preventing them from growing or reproducing. As this process depletes silver from the material, a silver-based antibacterial product cannot be active indefinitely. When released by the material, silver ions act on the bacteria (see Y. Noue, Y. Kanzaki, *Journal of Inorganic Biochemistry* 67:377 (1997)), according to a still unknown mechanism, which can be summarized in this way: uptake of silver by a bacterial cell, leads to destruction of its cell wall, inhibition of reproduction and inhibition of metabolism (M. Potenza, G. Levinsons, AIM Magazine 59:39 (2004)). Silver has no toxic effects on living human cells. It has very potent antibacterial activity, since a solution with only 1 ppm of pure elemental silver has an effective bacterial killing action. Natural or synthetic materials (e.g., fabric, woven and similar), with antibacterial properties have already been realized in several fields, such as clothing, medicine, filtering systems, transportation and others. They have different shapes and tradenames but all of them are very expensive, because of the existing difficulties in their realization.

SUMMARY OF THE INVENTION

The present invention provides methods for depositing elemental silver on a substrate and compositions prepared using these methods. The compositions of the invention have antimicrobial properties.

In one embodiment, the invention relates to a method for depositing elemental silver onto a substrate, comprising the steps of: (a) coating the substrate with a solution comprising a silver salt, water and an alcohol, wherein the concentration of $Ag^+$ in the solution is from 0.003 to 0.32 wt %; and (b) exposing the coated substrate to ultraviolet radiation, thereby depositing elemental silver onto the substrate.

In a further embodiment, the invention relates to a method for depositing elemental silver onto a substrate, comprising the steps of: (a) coating the substrate with a solution comprising a silver salt, an alcohol and colloidal silver; and (b) exposing the coated substrate to ultraviolet radiation, thereby depositing elemental silver onto the substrate.

In yet another embodiment, the invention relates to a method for depositing elemental silver onto a substrate, comprising the steps of: (a) coating the substrate with a solution comprising a silver salt, an alcohol and suspended micronized silver; and (b) exposing the coated substrate to ultraviolet radiation, thereby depositing elemental silver onto the substrate.

In another embodiment, the invention relates to a method for depositing elemental silver onto a substrate, comprising the steps of (a) coating the substrate with a solution comprising a silver salt and an alcohol and capsules, wherein the capsules are suspended in the solution and comprise a silver salt, an alcohol and water; and (b) exposing the coated substrate to ultraviolet radiation, thereby depositing elemental silver onto the substrate.

The present invention further relates to compositions, such as antimicrobial compositions, prepared using any of the methods described herein, and articles of manufacture comprising such compositions.

BRIEF DESCRIPTION OF THE DRAWING

The FIGURE is a graph reporting the values of swelling ratio obtained by synthetic hydrogels impregnated in silver solutions containing different amounts of silver nitrate. The decrease of the swelling ration indicates improved crosslinking induced by the presence of $AgNO_3$.

DETAILED DESCRIPTION OF THE INVENTION

The present invention provides methods for depositing elemental silver on a substrate, as well as the compositions produced using these methods and methods of using these compositions. In particular, the present methods enable deposition of elemental silver while using significantly reduced amounts of silver salts and alcohol, such as methanol, compared to previous methods. In addition, the present methods enable the deposition of elemental silver onto a wide variety of substrates, including substrates with either rough or smooth surfaces.

In a first aspect, the invention relates to a method for depositing elemental silver onto a substrate, comprising the steps of: (a) coating the substrate with a solution comprising a silver salt, water and an alcohol, wherein the concentration of $Ag^+$ in the solution is about 0.32 wt % or less; and (b) exposing the coated substrate to ultraviolet radiation, thereby depositing elemental silver onto the substrate.

In certain embodiments of the first aspect of the invention, the concentration of $Ag^+$ in the solution of step (a) is about 0.003 to about 0.32 wt %. For example, the concentration of $Ag^+$ can be from about 0.003 to about 0.16 wt %, about 0.003 to about 0.08 wt %, about 0.003 to 0.04 wt %, about 0.003 to 0.02 wt %, about 0.003 to 0.01 wt % or about 0.003 to 0.006 wt %. In preferred embodiments, the concentration of $Ag^+$ in the solution of step (a) is about 0.005 to about 0.007 wt %, about 0.006 to 0.007 wt %, about 0.0055 to about 0.0065 wt % or about 0.0064 wt %.

The concentration of alcohol in the solution of step (a), in wt %, is preferably at least about 2 times the concentration of $Ag^+$. More preferably, the concentration of alcohol in the solution of step (a), in wt %, is at least about 3 times the concentration of $Ag^+$. For example, when the silver salt is silver nitrate at a concentration of 0.01 wt %, the $Ag^+$ concentration is about 0.0064 wt %, and alcohol concentration is preferably at least about 0.013 wt %. In preferred embodiments, the alcohol concentration is at least three times the $Ag^+$ concentration and less than 50 wt %. In certain embodiments, the alcohol concentration is at least three times the $Ag^+$ concentration and less than 40 wt %, less than 30 wt %, less than 20 wt %, less than 10 wt %, less than 5 wt %, less than 1 wt % or less than 0.75 wt %. In certain embodiments, the alcohol concentration is from two times the $Ag^+$ concentration, in wt %, to four times the $Ag^+$ concentration. In certain embodiments, the $Ag^+$ concentration is about 0.0064 wt % and the alcohol concentration is about 0.02 wt %.

As discussed further below, the silver salt present in the solution of step (a) can be any silver salt which is sufficiently soluble to provide the desired concentration of $Ag^+$. A preferred silver salt is silver nitrate. In a preferred embodiment, the silver salt is silver nitrate and the alcohol is methanol. The concentration of silver nitrate in the solution of step (a) is preferably about 0.0005 wt % to 0.005 wt %, about 0.00075 wt % to 0.0025 wt % or about 0.001 wt %.

In a second aspect, the invention provides a method for depositing elemental silver onto a substrate, comprising the steps of: (a) coating the substrate with a solution comprising a silver salt, an alcohol and colloidal silver; and exposing the coated substrate to ultraviolet radiation, thereby depositing elemental silver onto the substrate.

The colloidal silver consists of suspended silver nanoparticles (AgNPs). Without being bound by theory, it is believed that the AgNPs promote the synthesis of silver clusters on the substrate and reduce the required UV exposure times. As reported in Example 2 below, colloidal silver can be added during the preparation of the silver salt solution with stirring to promote homogeneous dispersion into the silver solution. Then, the deposition of the silver solution is performed through dip coating or spray coating and the UV exposure follows coating. In certain embodiments, the AgNPs have a particle size less than 300 nm, preferably less than 250 nm, more preferably less than 200 nm and most preferably less than 150 nm. The AgNPs can be added to the solution in any suitable amount. In certain embodiments, the concentration of the AgNPs in the solution of step (a) is 0.01 to 1 ppm, preferably 0.05 to 0.5 ppm and more preferably about 0.1 ppm.

In certain embodiments of the second aspect of the invention, the solution of step (a) further comprises a complexing agent, such as a bidentate ligand. Preferably, the complexing agent is acetylacetone. The presence of such complexing agents in the solution is believed to prevent the aggregation of the silver nanoparticles.

In a third aspect, the invention provides a method for depositing elemental silver onto a substrate, comprising the steps of: (a) coating the substrate with a solution comprising a silver salt and an alcohol and capsules, wherein the capsules are suspended in the solution and comprise a silver salt, an alcohol and water; and (b) exposing the coated substrate to ultraviolet radiation, thereby depositing elemental silver onto the substrate.

The capsules preferably comprise a wall material that is opaque to radiation. Preferably, the capsules are formed of a polymer, such as polyethylene glycol. Thus, the silver salt in the capsules is not reduced to elemental silver when the coated substrate is exposed to UV radiation. The capsule therefore is present in the coating and can be ruptured to release their contents which form additional elemental silver. Without being bound by theory, it is believed that mechanical stress on the substrate, which can compromise the silver coating, can also induce rupture of the capsules and generation of new silver clusters, thereby renewing the silver coating. The capsules are preferably microcapsules, that is, capsules having a size from 1 μm up to 1000 μm. Preferably the microcapsules are in the size range of 5 to 200μ and more preferably from 20 to 120 μm.

In a fourth aspect, the invention provides a method for depositing elemental silver onto a substrate, comprising the steps of: (a) coating the substrate with a solution comprising a silver salt, an alcohol and micronized silver; and exposing the coated substrate to ultraviolet radiation, thereby depositing elemental silver onto the substrate.

In this fourth aspect of the invention, the substrate preferably has a rough surface. Without being limited by theory, it is believed that the presence of low concentrations of micronized silver allows the deposition of thinner coatings, due to the inclusion of the silver microparticles into the voids on the substrate surface. In one embodiment, the solution of step (a) comprises silver microparticles having a mean particle size of about 1 μm to about 500 μm, about 1 μm to about 100 μm, or about 1 μm to about 20 μm. In one embodiment, the silver microparticles have a mean particle size of about 10 μm. In certain embodiments, the amount of micronized silver added to the solution of step (a) is about 0.01 to 0.1 wt %, preferably 0.03 to 0.07 wt % and more preferably about 0.05 wt %.

In certain embodiments of the second, third and fourth aspects of the invention, the $Ag^+$ concentration in the solution of step (a) is about 0.003 wt % to about 7 wt %. In certain embodiments, the $Ag^+$ concentration in the solution of step (a) is about 0.003 to 5 wt %, 0.003 to 4 wt %, 0.003 to 3 wt %, 0.003 to 2 wt %, 0.003 to 1 wt %, 0.003 to 0.75 wt %, 0.003 to 0.5 wt, 0.003 to 0.4 wt %, 0.003 to 0.2 wt %, 0.003 to 0.16 wt %, 0.003 to 0.1 wt %, 0.003 to 0.08 wt %, 0.003 to 0.04 wt %, 0.003 to 0.02 wt %, 0.003 to 0.01 wt % or 0.003 to 0.007 wt %. In certain embodiments, the concentration of $Ag^+$ in the solution of step (a) is 0.006 to 0.007 wt % or 0.635 wt %.

In certain embodiments of the second, third and fourth aspects of the invention, the concentration of $Ag^+$ in the solution of step (a) is about 0.003 to about 0.32 wt %. For example, the concentration of $Ag^+$ can be from about 0.003 to about 0.16 wt %, about 0.003 to about 0.08 wt %, about 0.003 to 0.04 wt %, about 0.003 to 0.02 wt %, about 0.003 to 0.01 wt % or about 0.003 to 0.006 wt %. In preferred embodiments, the concentration of $Ag^+$ in the solution of step (a) is about 0.005 to about 0.007 wt %, about 0.006 to 0.007 wt %, about 0.0055 to about 0.0065 wt % or about 0.0064 wt %.

In certain embodiments of the second, third and fourth aspects of the invention, the alcohol is the sole solvent in the solution of step (a); that is, the solution does not comprise water. In other embodiments, the solution comprises water. For example, the solution can be greater than 50 wt % water, greater than 75 wt % water, greater than 90 wt % water or greater than 95 wt % water.

Preferably, the solution of step (a) in the second, third and fourth aspects of the invention further includes water and he concentration of alcohol in the solution of step (a), in wt %, is at least about 2 times the concentration of $Ag^+$. More preferably, the concentration of alcohol in the solution of step (a), in wt %, is at least about 3 times the concentration of $Ag^+$. For example, when the silver salt is silver nitrate at a concentration of 0.01 wt %, the $Ag^+$ concentration is about 0.0064 wt %, and alcohol concentration is preferably at least about 0.013 wt %. In preferred embodiments, the alcohol concentration is at least three times the $Ag^+$ concentration and less than 50 wt %. In certain embodiments, the alcohol concentration is at least three times the $Ag^+$ concentration and less than 40 wt %, less than 30 wt %, less than 20 wt %, less than 10 wt %, less than 5 wt %, less than 1 wt % or less than 0.75 wt %. In certain embodiments, the alcohol concentration is from two times the $Ag^+$ concentration, in wt %, to four times the $Ag^+$ concentration. In certain embodiments, the $Ag^+$ concentration is about 0.0064 wt % and the alcohol concentration is about 0.02 wt %.

In certain embodiments of the second to fourth aspects of the invention in which the solution of step (a) has a relatively high $Ag^+$ concentration, such as 1 wt % or greater, and a relatively high alcohol content, such as 50 wt % or higher, ultrasound can be used to accelerate the dissolution of the silver salt. For example, the solution can be ultrasonicated for several minutes, until completely homogenous.

According to laboratory tests, solutions of silver salts as described herein can be stored for a significant time in the dark without losing effectiveness. Thus, a solution can be stored and ready to use when a substrate is to be coated. In cases in which the $Ag^+$ concentration is high, for example 1 wt % or greater, the stored solution is optionally ultrasonicated shortly before use.

In any aspect of the invention, the alcohol in the solution of step (a) is preferably a $C_1$-$C_6$-alcohol, more preferably a primary $C_1$-$C_6$-alcohol, such as 1-propanol, ethanol or methanol. In particularly preferred embodiments, the alcohol is methanol. The concentration of methanol in the solution of step (a) in the first to fourth aspects of the invention is preferably at least about 3 times the concentration (in wt %) of $Ag^+$. In certain embodiments, the amount of methanol in the solution of step (a) in any aspect of the invention is from about 3 to about 4 times the concentration (in wt %) of $Ag^+$. When the silver salt is silver nitrate, the concentration of methanol in the solution is preferably at least two times the concentration (in wt %) of the silver nitrate and in certain embodiments is from about 2 times to about 5 times the concentration of silver nitrate.

The silver salt used to prepare the solution of step (a) in any aspect of the invention can be any silver salt with sufficient solubility in the solvent used to provide the desired $Ag^+$ concentration. Non-limiting examples of suitable silver salts include silver nitrate, silver fluoride, silver acetate and silver permanganate. Silver nitrate is a particularly preferred silver salt.

In any aspect of the invention, the substrate can be any material having a surface which can be coated with elemental silver. For example, the substrate can be a textile, in the form of one or more fibers or cloth, such as woven or knitted cloth, formed of natural or synthetic materials. For example, the textile can be made of cotton, linen, polyester, nylon, wool and silk. In another embodiment, the substrate is leather, plastic or a hydrophobic polymer, such as polystyrene or polyurethane.

In certain embodiments the substrate is subjected to plasma treatment prior to the coating step to increase the surface roughness. Such plasma treatment is particularly useful when the substrate has a smooth surface, such as a smooth plastic.

In one embodiment, the substrate is one or more absorbent fibers, for example, fibers formed from an absorbent cross-linked polymer. In certain embodiments, the fibers are superabsorbent, that is, they are able to absorb an amount of water which is at least twenty times their dry weight. Such treated absorbent fibers can be integrated into textile materials in order to improve their absorption properties. As a novel feature of this application, an additional crosslinking of the hydrogel has been obtained by using silver nitrate in order to obtain improved stability and antibacterial properties at the same time. Without being bound by theory, it is believed that the mechanism of crosslinking involves the interaction of silver ions with the hydrogel chains. For example, when the polymer contains carboxyl groups, silver can form their coordination complexes with the carboxyl groups during the crosslinking.

The term "coating" as used herein refers to contacting a substrate with the silver salt solution, such that at least a surface of the substrate is wetted by the solution. Depending on the nature of the substrate, coating can also result in absorption of some amount of the solution by the substrate. In any aspect of the invention, the substrate is coated according to step (a) using any method which results in application of the solution to at least a surface of the substrate. For example, any coating process can be used, including, but not limited to, dip coating, spray coating, laminar coating or spin coating.

The coated substrate can be exposed to the UV radiation immediately after coating, that is, while still wet, or can be exposed to UV radiation after drying. In certain embodiments, the substrate is coated, dried and stored for a period of time prior to exposure to UV radiation. Preferably, the coated substrate is stored in the substantial absence of UV radiation, for example in the dark.

In any aspect of the invention, the coated substrate is exposed to ultraviolet radiation at an intensity and for a time sufficient to reduce the $Ag^+$ to elemental silver. The source of the ultraviolet radiation can be a UV lamp (fluorescence or incandescent lamp) or a UV laser (laser source with different lenses such as line effect lens). In certain embodiments, a radiation power range between 20 $W/m^2$ and 10000 $W/m^2$ can be used with an exposure time between 5 sec and 30 minutes, and a wavelength between 285 and 400 nm. In preferred embodiments, the distance of the lamp from the substrate is about 10 cm, corresponding to a power of 500 $W/m^2$ and an exposure time between 1 and 2 minutes.

In certain embodiments of any aspect of the invention, the method can further comprise the step of washing the product of step (b) with water, preferably with ultrasonication. This washing step removes unreacted silver salt and is particularly beneficial in embodiments in which the silver-coated substrate is to be used in contact with food or biological cells or tissues.

The silver-coated substrates prepared by the methods disclosed herein can be used in a variety of applications, for example in food packaging, in medical devices such as prosthesis, scaffolds and indwelling devices, in textile application, in wound dressing etc.

EXAMPLES

Example 1

The deposition of elemental silver onto a textile substrate can be performed as follows: (a) Preparing the silver solution. 100 g of solution containing 0.01 wt % of silver nitrate requires 0.02 g of methanol, 0.01 g $AgNO_3$ and 99.97 g water. The silver nitrate was dissolved in the methanol/water mixture with magnetic stirring for few minutes; b) the textile substrate (cotton gauze) was dipped into the silver solution; c) the resulting wet substrate was exposed to the UV source for 10 minutes per side. Alternatively, the UV exposure can be performed after drying the substrate.

The antibacterial efficacy of the samples was tested on *Escherichia coli*, as an example of Gram-negative bacteria. The antibacterial test involved the incubation of silver-treated and untreated cotton gauze samples in a bacterial solution with a known concentration of bacteria. Then, bacterial enumeration tests were performed in triplicate through spectrophotometric measurements and the results are set forth in Table 1.

TABLE 1

| SAMPLE | Optical Density | Average | Bacterial Proliferation [%] | Bacterial Reduction [%] |
|---|---|---|---|---|
| Control 1 (bacterial solution) | 1.091 | 1.072 | | |
| Control 2 (bacterial solution) | 1.074 | | | |
| Control 3 (bacterial solution) | 1.052 | | | |
| Untreated sample 1 | 0.810 | 0.730 | 100 | |
| Untreated sample 2 | 0.681 | | | |
| Untreated sample 3 | 0.700 | | | |
| Sample 1 (Treated with silver nitrate solution) | 0.522 | 0.563 | 77.04245 | 22.95755 |
| Sample 2 (Treated with silver nitrate solution) | 0.531 | | | |
| Sample 3 (Treated with silver nitrate solution) | 0.635 | | | |

Example 2

An example of the synergistic effect between the photoreduction process and the use of colloidal silver is described below.

a) Preparing the silver solution. 100 g of a solution containing 0.01 wt % of silver nitrate requires 0.02 g methanol, 0.01 g $AgNO_3$ and 99.97 g water. The silver nitrate was dissolved in the methanol/water mixture with magnetic stirring, and colloidal silver (1 ml of colloidal silver, concentration 20 ppm, particle size<150 nm) was added with continued stirring; b) the substrate (cotton gauze) was dipped in the silver solution; c) the wet substrate was exposed to a UV source for 10 minutes per side. Alternatively, the substrate can be allowed to dry and then exposed to the UV source.

The antibacterial efficacy of the samples was tested on *Escherichia coli*, as example of Gram-negative bacteria. The antibacterial test involved the incubation of silver-treated and untreated cotton gauze sample into a bacterial solution with a known concentration of bacteria. Then, bacterial enumeration tests were performed in triplicate through spectrophotometric measurements and the results obtained are set forth in Table 2.

TABLE 2

| SAMPLE | Optical Density | Average | Bacterial Proliferation [%] | Bacterial Reduction [%] |
|---|---|---|---|---|
| Control 1 (bacterial solution) | 1.091 | 1.072 | | |
| Control 2 (bacterial solution) | 1.074 | | | |
| Control 3 (bacterial solution) | 1.052 | | | |
| Untreated sample 1 | 0.810 | 0.730 | 100 | |
| Untreated sample 2 | 0.681 | | | |
| Untreated sample 3 | 0.700 | | | |
| Sample 1 (Treated with silver nitrate solution and colloidal silver) | 0.444 | 0.550 | 75.35372 | 24.64628 |
| Sample 2 (Treated with silver nitrate solution and colloidal silver) | 0.588 | | | |
| Sample 3 (Treated with silver nitrate solution and colloidal silver) | 0.619 | | | |

Example 3

An example of additional crosslinking procedure on a superabsorbent hydrogel and the related effect on the swelling ratio are described below.
(a) Preparation of silver solutions. 50 g of six different silver solutions containing respectively 0.25 wt %, 0.5 wt %, 1 wt %, 1.25 wt %, 2.5 wt % and 5 wt % of silver nitrate were dissolved in deionized water; b) 0.6 g of crosslinked polyacrylate hydrogel fibres were dipped into each silver solution for 10 minutes; c) The resulting wet substrates were dried at 40° C. for 6 h.

The effect of the impregnation of the hydrogel into the silver solution was evaluated through swelling tests and the results obtained shown in the FIGURE and in Table 3.

The FIGURE is a graph reporting the values of swelling ratio in distilled water obtained by synthetic hydrogels impregnated in silver solutions containing different amounts of silver nitrate. The decrease of the swelling ration indicates improved crosslinking induced by the presence of $AgNO_3$.

TABLE 3

| Weight Percentage of $AgNO_3$ | Initial weight (Dry sample) | Weight after the treatment (Dry sample) | Weight after the treatment (Swollen sample) | Swelling ratio |
|---|---|---|---|---|
| 0 | 0.63 g | 0.59 g | 22.8 g | 37.64 |
| 0.25 | 0.61 g | 0.41 g | 10.3 g | 24.12 |
| 0.5 | 0.62 g | 0.54 g | 10.6 g | 18.63 |
| 1 | 0.63 g | 0.7 g | 6.6 g | 8.43 |
| 1.25 | 0.62 g | 0.77 g | 4.5 g | 4.84 |
| 1.5 | 0.63 g | 0.82 g | 3.34 g | 3.07 |
| 5 | 0.59 g | 0.78 g | 2.83 g | 2.63 |

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for depositing elemental silver onto a hydrogel, comprising the steps of:
   a) coating the hydrogel with a solution comprising a silver salt, water and an alcohol, wherein the concentration of $Ag^+$ in the solution is from 0.003 to 0.32 wt %; and
   b) exposing the coated hydrogel to ultraviolet radiation, thereby depositing elemental silver onto the hydrogel.

2. The method of claim 1, wherein the concentration of $Ag^+$ in the solution of step (a) is 0.003 to 0.16 wt %, 0.003 to 0.08 wt %, 0.003 to 0.04 wt %, 0.003 to 0.02 wt %, 0.003 to 0.01 wt % or 0.003 to 0.006 wt %.

3. The method of claim 1, wherein the silver salt is silver nitrate, silver fluoride, silver acetate or silver permanganate.

4. The method of claim 1, wherein the alcohol is a primary $C_1$-$C_6$-alcohol.

5. The method of claim 1, wherein the source of the ultraviolet radiation in step (b) is an ultraviolet laser.

6. A method for depositing elemental silver onto a hydrogel, comprising the steps of:
   a) coating the hydrogel with a solution comprising a silver salt, an alcohol and (i) colloidal silver or (ii) suspended micronized silver, wherein the concentration of $Ag^+$ in the solution is from 0.003 to 0.32 wt %; and
   b) exposing the coated hydrogel to ultraviolet radiation, thereby depositing elemental silver onto the hydrogel.

7. The method of claim 6, wherein the $Ag^+$ concentration in the solution of step (a) is 0.003 wt % to 0.08 wt %.

8. The method of claim 7, wherein the concentration of $Ag^+$ in the solution of step (a) is 0.006 to 0.007 wt %.

9. The method of claim 6, wherein the silver salt is silver nitrate, silver fluoride, silver acetate or silver permanganate.

10. A method for depositing elemental silver onto a substrate, comprising the steps of:
    a) coating the substrate with a solution comprising a silver salt and an alcohol and capsules, wherein the capsules are suspended in the solution and comprise a silver salt, an alcohol and water; and
    b) exposing the coated substrate to ultraviolet radiation, thereby depositing elemental silver onto the substrate.

11. The method of claim 10, wherein the $Ag^+$ concentration in the solution of step (a) is 0.003 wt % to 7 wt %.

12. The method of claim 1, wherein the method crosslinks the hydrogel with silver.

13. The method of claim 6, wherein the method crosslinks the hydrogel with silver.

14. The method of claim 10, wherein the substrate is a textile, leather, plastic or a hydrophobic polymer.

15. The method of claim 10, wherein the substrate is a hydrogel.

16. The method of claim 15, wherein the method crosslinks the hydrogel with silver.

17. The method of claim 10, wherein the capsules comprise a wall material which is opaque to ultraviolet radiation.

18. The method of claim 10, wherein the capsules have a size from 1 µm to 1000 µm.

* * * * *